Oct. 15, 1929.  R. CHILTON  1,731,451
UNIVERSAL CRANKING MECHANISM FOR STARTERS OR THE LIKE
Filed June 18, 1928
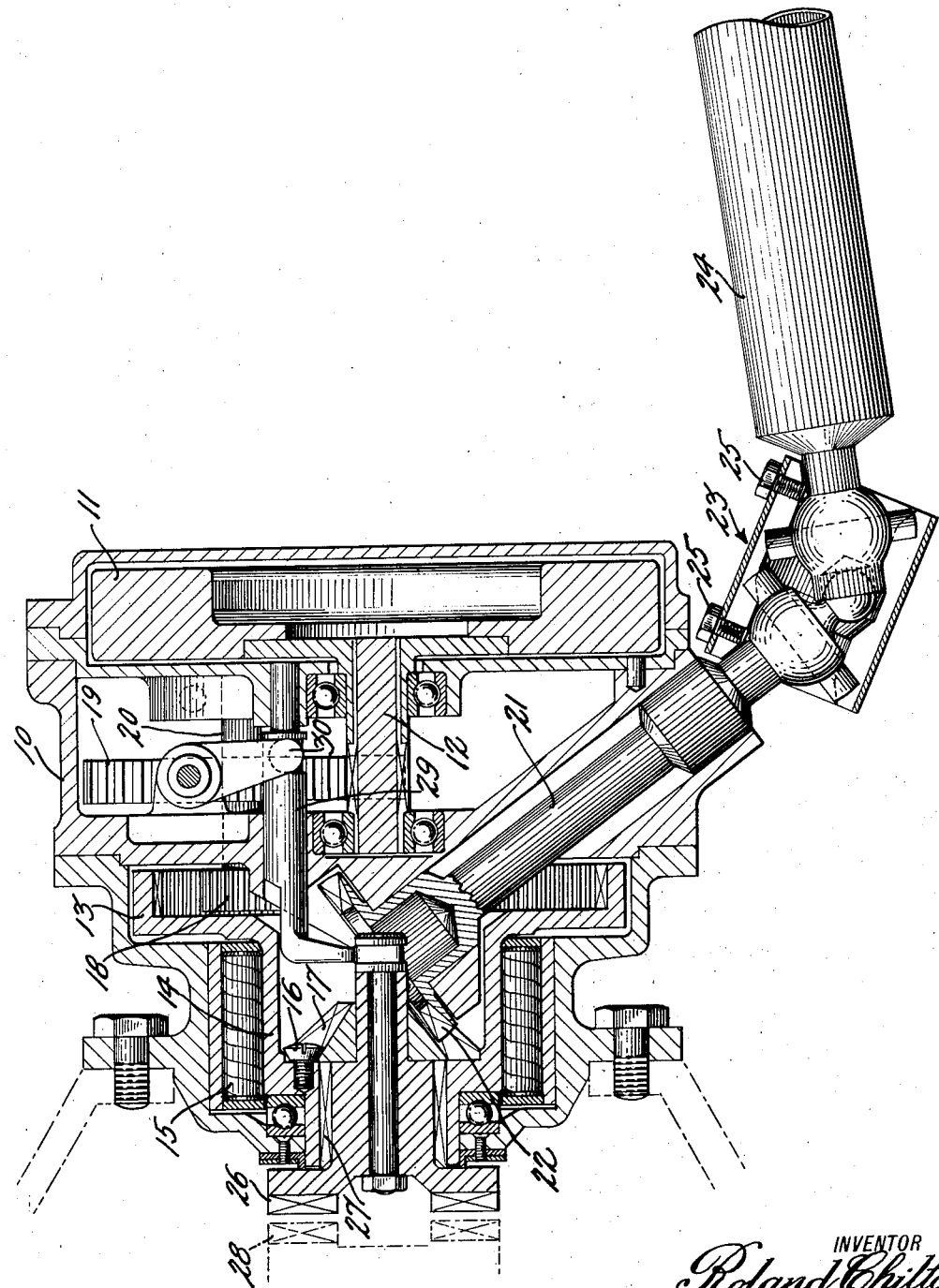
INVENTOR
Roland Chilton
BY
Nemer P. Rathermund
ATTORNEY Patented Oct. 15, 1929

1,731,451

UNITED STATES PATENT OFFICE

ROLAND CHILTON, OF KEYPORT, NEW JERSEY, ASSIGNOR, BY MESNE ASSIGNMENTS, TO ECLIPSE MACHINE COMPANY, OF ELMIRA HEIGHTS, NEW YORK, A CORPORATION OF NEW YORK

UNIVERSAL CRANKING MECHANISM FOR STARTERS OR THE LIKE

Application filed June 18, 1928. Serial No. 286,120.

This invention relates to starters and to geared hand cranks for internal combustion engines and the like and comprises an improved gearing for the energization of such starters from an external source of power such as a hand crank or an electric motor. Starters of the inertia type, for example, wherein a flywheel is energized by hand or electric cranking are extensively used on aircraft engines and it is sometimes desired to lead the external power shaft out transversely to the engine axis as for operation from the side of the fuselage, and sometimes longitudinally as for cranking from the cockpit of the airplane. Heretofore this has involved the construction of different machines or a plurality of shafts disposed at right angles to one another to accommodate the two conditions. Accordingly, one object of this invention is to provide a structure which will be adapted, without change or reassembly of the parts, for both longitudinal and transverse cranking. This involves the ability to dispose the cranking shaft at any angle in plan aspect within a range of 90 degrees and a universal joint of this angular capacity is apt to be bulky, inefficient and expensive.

In the present invention a universal joint having angular capacity of approximately one-half the angle between the extreme shaft dispositions is adequate and to this end the cranking shaft of the starter is disposed at an intermediate position substantially half way between the longitudinal and transverse attitudes.

A further object of the invention is to permit a reduction in the bulk and particularly in the length of the starter, a substantial amount of which, in the machines of the prior art, has been accounted for by the space occupied by the cranking gear. This usually engages a low speed shaft supported on bearing means in the starter housing and having a main drive gear between the cranking gear and this bearing, other starter mechanism being often heretofore separated from this main gear sufficiently to accommodate the diameter of the cranking gear. By the angular disposition of the cranking gear in this invention, and by its incorporation within the bearing supporting the main starting gear, other mechanism may be placed in close proximity to this main gear in the axial direction thus affording a substantial economy in length and weight. The same result has been obtained in the showing of my Patent No. 1,660,953 by the introduction of compound cranking gears and one of the objects of this invention is to achieve this compactness with simple cranking gears.

In starters for aircraft engines the hand cranking shaft, when transversely disposed, has usually to clear various engine accessories, such as magnetos, etc., and it is of advantage on this account to have the shaft issue from the end of the starter remote from the engine so as to pass behind these obstructions. This condition is fulfilled in a simple manner by the angular disposition of the shaft of this invention. Starters of the character herein disclosed may be mounted on a circular flange on the engine permitting the starter to be installed in various attitudes and the large angle universal joint here provided therefore permits the hand crankshaft to be raised or lowered without changing its angular attitude, if so desired. These provisions in combination provide a very flexible installation giving universal latitude in the cranking shaft position to suit the great variety of installation conditions to be met.

Various other objects and advantages of the invention will be in part obvious from an inspection of the accompanying drawings and a careful consideration of the following particular description and claims of one form of mechanism embodying my invention. The drawing is a longitudinal section of the preferred form of the present invention.

With reference to the drawing, 10 designates the housing of an inertia type engine starter such as described in my Patent No. 1,561,506 in which a flywheel 11 energizable to high speed from a source of power, is mounted on the shaft of a pinion 12 for rotation therewith.

In axial alignment with this pinion 12 there is disposed an internal gear 13 having a hollow hub portion 14 by means of which the gear is rotatably mounted in a bearing 15 secured in the housing 10. Disposed within the hollow hub portion 14 and secured thereto in any suitable manner such as by the screw 16, is a bevel gear 17. A pinion 18 and a gear 19 mounted upon a laterally disposed lay shaft 20 provide a driving connection between the pinion 12 and the internal gear 13.

Rotatably mounted within the housing 10 and extending within the hollow hub portion 14, is a power shaft 21 disposed at an angle intermediate a longitudinal and transverse attitude with respect to the main axis of the starter and provided at its inner end with a bevel gear 22 meshing with the aforesaid bevel gear 17. At the outer end of the shaft 21 there is provided a universal joint 23 which connects said shaft to an extension shaft 24 which may be driven from a source of power such as a manually operated hand-crank or an electric motor. It will be readily seen that with the disposition of the shaft 21 as shown in the drawings, the extension shaft 24 can be drivably disposed in any attitude between that parallel to the axis of the starter or transverse thereto without requiring from the universal joint a greater angular range than the angle of the shaft 21.

The screws 25 which are intended to prevent separation of the joint elements are shown for convenience as being 90 degrees out of position and would in reality occupy a position at right angles to the plane of the paper.

In operation the flywheel 11 is energized from an exterior source of power through the shafts 21 and 24, the universal joint 23, bevel gears 17 and 22 and the gears and pinions 13, 18, 19 and 12. When the flywheel has thus been sufficiently energized, a jaw clutch 26, driven from the internal gear 13 by means of the splines 27 is axially shifted into engagement with a means to be driven such as designated by 28, by the employment of a shifting mechanism 29 and 30.

Variations may be resorted to within the scope of the invention and portions of the improvements may be used without the others, whilst not departing from the spirit of the invention.

Having thus described my invention, I claim:—

1. In an engine starter having a main gear, the combination of, an extended hub on the gear, bearing means supporting said hub, and cranking gears disposed within the width of said hub and gear and drivably engaged therewith.

2. In a starter having a main starting gear, the combination of a driven cranking gear secured thereto, a driving cranking gear engaged with the driven gear at an angle substantially intermediate to the transverse and longitudinal with respect to the starting gear axis.

3. In a starter, the combination of a cranking shaft disposed at an angle intermediate between the longitudinal and transverse with respect to the starter axis, a universal joint engaging the shaft, and a power shaft drivably engaging the joint and disposable anywhere within an angle of 90° with respect to the starter axis without substantially exceeding one-half that angle at the joint.

4. In a starter, the combination of a main starting gear, a hollow drive hub rigid with the gear, and cranking bevel gears drivably connected to said main gear and disposed within said hub and gear for the purpose of permitting other mechanism to be placed closely adjacent to the side of said main gear.

5. In a starter, the combination of a main cranking gear, a hollow hub rigid therewith, a supporting bearing for said hub, and driving means for said gear disposed within said bearing and hub.

6. In a starter, the combination of a main starting gear having a hollow hub, a first cranking gear rigidly united with said hub, a second cranking gear drivably engaged with the first said gear and having a shaft extending from the starter intermediate the rectangular and parallel attitudes with respect to the starter axis.

7. In a starter, the combination of a main starting gear, a hub barrel rigid therewith, a cranking gear secured to the hub toward one end of the starter, a shaft for the cranking gear extending through the side of the starter at the other end thereof, and a gear drivably engaging the shaft with the cranking gear set forth.

8. In a starter, the combination of a main starting gear having a hollow hub portion, a pair of cranking bevel gears disposed within said hub portion and at substantially one-half a right angle to each other, a cranking shaft connected to one of said bevel gears, a universal joint of substantially one-half a right angle range connected to said shaft and adapted to be engaged by a rotary power means which may accordingly have its axis disposed either parallel or normal to the starter axis or in intermediate positions as may be desired.

9. In a starter for an engine, the combination of a flywheel, a gear drivably connected to said flywheel, engine engaging means driven from said gear, bevel gears disposed within said gear, and a drive shaft for said bevel gears said shaft being disposed at a substantial angle to the axis of the flywheel but less than a right angle.

10. In a starter for an engine, the combination of a flywheel, a gear drivably connected to said flywheel, engine engaging means driven from said gear, a drive shaft provided with means to drivably engage said gear internally thereof, universal joint means at the outer end of said shaft, and an extension shaft connecting with said joint and adapted for disposition either parallel to or transverse of the flywheel axis.

Signed at Keyport, in the county of Monmouth, and State of New Jersey, this 14th day of June, 1928.

ROLAND CHILTON.